(12) United States Patent
Grosse et al.

(10) Patent No.: US 9,792,381 B2
(45) Date of Patent: Oct. 17, 2017

(54) METHOD AND APPARATUS FOR A PAGED UPDATE PROTOCOL

(75) Inventors: Alexander Grosse, Berlin (DE); Andreas Schmidt, Berlin (DE); Felix Weigel, Berlin (DE); Konstantin Clemens, Berlin (DE)

(73) Assignee: HERE Global B.V., Veldhoven (NL)

( * ) Notice: Subject to any disclaimer, the term of this patent is extended or adjusted under 35 U.S.C. 154(b) by 808 days.

(21) Appl. No.: 12/824,971

(22) Filed: Jun. 28, 2010

(65) Prior Publication Data

US 2011/0320408 A1    Dec. 29, 2011

(51) Int. Cl.
| | | |
|---|---|---|
| G06F 7/00 | (2006.01) | |
| G06F 17/00 | (2006.01) | |
| G06F 17/30 | (2006.01) | |
| G06F 21/62 | (2013.01) | |

(52) U.S. Cl.
CPC ...... *G06F 17/3089* (2013.01); *G06F 21/6227* (2013.01)

(58) Field of Classification Search
None
See application file for complete search history.

(56) References Cited

U.S. PATENT DOCUMENTS

| | | | |
|---|---|---|---|
| 5,893,908 A * | 4/1999 | Cullen et al. | |
| 6,088,707 A * | 7/2000 | Bates et al. | ............... 715/235 |
| 6,282,548 B1 * | 8/2001 | Burner | ............ G06F 17/3089 |
| 7,730,107 B1 | 6/2010 | Shultz et al. | |
| 2002/0010757 A1 * | 1/2002 | Granik et al. | ................. 709/218 |
| 2002/0168792 A1 * | 11/2002 | Goldberg | ............ A63B 22/0605 |
| | | | 438/57 |
| 2003/0051141 A1 * | 3/2003 | Veyrassat | ............... G06Q 10/08 |
| | | | 713/170 |
| 2004/0143668 A1 | 7/2004 | Falk et al. | |
| 2004/0202329 A1 * | 10/2004 | Jung | ................... H04L 63/0428 |
| | | | 380/273 |
| 2006/0168510 A1 * | 7/2006 | Bryar | .................... G06F 17/212 |
| | | | 715/229 |
| 2007/0012761 A1 * | 1/2007 | Paone | ............. G06K 19/07336 |
| | | | 235/380 |
| 2007/0219908 A1 | 9/2007 | Martinez | |
| 2007/0233748 A1 * | 10/2007 | Chang | ............... G06F 17/30884 |
| 2007/0288589 A1 * | 12/2007 | Chen et al. | .................... 709/217 |

(Continued)

FOREIGN PATENT DOCUMENTS

| | | |
|---|---|---|
| CN | 101086737 A | 12/2007 |
| EP | 1 659 507 A2 | 5/2006 |

(Continued)

OTHER PUBLICATIONS

Feed Paging and Archiving (RFC 5005), Nottingham, Sep. 2007. Accessed: http://tools.ietf.org/html/rfc5005. pp. 1-16.

(Continued)

*Primary Examiner* — Hasanul Mobin
(74) *Attorney, Agent, or Firm* — Ditthavong & Steiner, P.C.

(57) ABSTRACT

An approach is provided for providing an update feed to clients. An update document comprising one or more update statuses of one or more resources is generated. At least one of the one or more resources is identified using a respective obfuscation identifier. The update document is divided into one or more pages. The one or more pages are archived.

18 Claims, 10 Drawing Sheets

(56) References Cited

U.S. PATENT DOCUMENTS

| | | | |
|---|---|---|---|
| 2007/0299767 A1 | 12/2007 | Barrett et al. | |
| 2008/0244721 A1* | 10/2008 | Barrus et al. | 726/9 |
| 2009/0106391 A1 | 4/2009 | Wang | |
| 2009/0147958 A1* | 6/2009 | Calcaterra | H04L 9/0822 |
| | | | 380/260 |
| 2009/0222329 A1 | 9/2009 | Ramer et al. | |
| 2010/0063995 A1 | 3/2010 | Chen et al. | |
| 2010/0070607 A1 | 3/2010 | Khan et al. | |
| 2010/0082682 A1* | 4/2010 | Kinoshita | G06F 17/3089 |
| | | | 707/784 |
| 2010/0306048 A1* | 12/2010 | Corduneanu | G06Q 30/02 |
| | | | 705/14.45 |

FOREIGN PATENT DOCUMENTS

| | | |
|---|---|---|
| JP | 2005-504365 A | 2/2005 |
| JP | 2008-124971 A | 5/2008 |
| JP | 2008-158589 A | 10/2008 |
| JP | 2009-252213 A | 10/2009 |
| WO | WO 2007/149665 A2 | 12/2007 |
| WO | WO 2009/143107 A2 | 11/2009 |
| WO | WO 2010/019706 A1 | 2/2010 |

OTHER PUBLICATIONS

Simple Update Protocol. Accessed: Aug. 18, 2010, http://code.google.com/p/simpleupdateprotocol/. pp. 1-2.

International Search Report for PCT Application No. PCT/FI2011/050546 dated Oct. 13, 2011, pp. 1-5.

Written Opinion for PCT Application No. PCT/FI2011/050546 dated Oct. 13, 2011, pp. 1-7.

Office Action for corresponding Japanese Application No. 2013-517420, dated Mar. 26, 2014, 12 pages (English of Office Action included).

Office Action for corresponding Korean Application No. 10-2013-7002103, dated Aug. 18, 2014, 11 pages (English Language Summary Included).

Office Action for corresponding Canadian Application No. 2,803,951, dated Oct. 7, 2014, 6 pages.

Japanese Office Action for related Japanese Application No. 2013-517420, dated Feb. 9, 2015, 2 pages.

Office Action for corresponding Chinese Patent Application No. 201180040161.8 dated Jun. 9, 2015, with English-language summary, 25 Pages.

Office Action for corresponding Chinese Patent Application No. 201180040161.8, dated Dec. 15, 2015, with English-language summary, 30 Pages.

Office Action for corresponding Canadian Patent Application No. 2803951, dated Nov. 23, 2015, 6 Pages.

Office Action for corresponding Chinese Patent Application No. 201180040161.8, dated May 31, 2016, with English-language summary, 26 Pages.

Notice of Allowance for corresponding Canadian Patent Application No. 2,803,951, dated Nov. 9, 2016, 1 page.

Office Action for corresponding Chinese Patent Application No. 201180040161.8, dated Nov. 2, 2016, English Language Summary Included, 24 pages.

Office Action for corresponding European Patent Application No. 11800239.3-1507, dated Aug. 8, 2017, 7 pages.

Buchheit, "FriendFeed Blog: Simple Update Protocol: Fetch updates from feeds faster", Aug. 27, 2008, web page http://blog.friendfeed.com/2008/08/simple-update-protocol-fetch-updates.html, pp. 1-8.

* cited by examiner

FIG. 1B

```
var alreadyProcessed = emptySet
var fullyProcessedUri = null
var fullyProcessedSinceTime = null
var fullyProcessedUpdateTime = null function processSubscription(url){                    ⎫ 121
    forever{
        var psup = getPSUP(url)
        var nextTry = now() + psup.period;
        // before processing the subscription document client
        // ensures that client have processed all already archived updates
        catchUpPrevArchives(psup);
        if( processSubscriptionPages(psup) ){
            // if all are successfully processed,
            // subscription pages client remembers this as fully processed
            fullyProcessedSinceTime = psup.sinceTime;
            fullyProcessedUpdateTime = psup.updateTime;
            fullyProcessedUri = psup.links.first;
            sleepUntil(nextTry);
        }
    }
}
                                                      ⎫ 123
function catchUpPrevArchives (psupResp){
    // is there previous archive at all?
    if( !exists(psupResp.links.prevArchive) ) return
    // did client process the previous one already?
    if( psupResp.links.prevArchive == fullyProcessedUri ) return;
    // fetch previous archvie
    var arch = getPSUP(psupResp.links.prevArchive);
    // ignore if client processed this time slot before
    if( arch.updateTime < fullyProcessedUpdateTime ) return;
    // check previous archives first
    catchUpPrevArchives(arch);
    // then process the updates
    checkAndProcessUpdates(arch);
}
```

FIG. 1C

```
function processSubscriptionPages(psupResp){                    ~ 141
    checkAndProcessUpdates(psupResp);
    if( !exists(psupResp.links.next) ) return true;
    var nextPage = getPSUP(psupResp.links.next);
    // fail if pages no longer exist or are outdated
    // client will catch up on next attempt from archives
    if( !nextPage.ok ) return false;
    if( nextPage.updateTime != psupResp.updateTime) return false;

processSubscriptionPages(nextPage);
} function checkAndProcessUpdates(psupResp){                      ~ 143
    foreach( update : psupResp.updates ) {
        if(alreadyProcessed.contains( [update.supId, update.updateId]))
            continue;
        alreadyProcessed.add([update.supId,update.updateId]);
        processUpdate( supId );
    }
}
```

METHOD AND APPARATUS FOR A PAGED UPDATE PROTOCOL

BACKGROUND

Service providers and device manufacturers (e.g., wireless, cellular, etc.) are continually challenged to deliver value and convenience to consumers by, for example, providing compelling network services. As a consequence, network services (e.g., mapping services, news services, etc.) have greatly increased in functionality, popularity, and content. One area of interest has been the development of services that include continuously and/or periodically updated content (e.g., updated point-of-interest information in a mapping service, updated news feeds, etc.). Generally, users can obtain this continuously and/or periodically updated content using various types of web syndication feeds and protocols such as the Atom Syndication Format, Really Simple Syndication, Simple Update Protocol, etc. However, technical limitations exist in the currently available syndication formats with respect to their ability to handle situations where, for instance, there are large numbers of simultaneous updates, updates occur more frequently than can be processed by a client, and/or updates are directed only to authorized users (e.g., by obfuscating updates except for those users subscribing to the updated content).

SOME EXAMPLE EMBODIMENTS

Therefore, there is a need for an approach for providing an update protocol that efficiently supports large numbers of updates while maintaining privacy and security of access to the updates.

According to one embodiment, a method comprises generating an update document comprising one or more update statuses of one or more resources. At least one of the one or more resources is identified using a respective obfuscation identifier. The method also comprises dividing the update document in one or more pages. The method further comprises archiving the one or more pages.

According to another embodiment, an apparatus comprising at least one processor, and at least one memory including computer program code, the at least one memory and the computer program code configured to, with the at least one processor, cause, at least in part, the apparatus to generate an update document comprising one or more update statuses of one or more resources. At least one of the one or more resources is identified using a respective obfuscation identifier. The apparatus is also caused to divide the update document in one or more pages. The apparatus is further caused to archive the one or more pages.

According to another embodiment, a computer-readable storage medium carrying one or more sequences of one or more instructions which, when executed by one or more processors, cause, at least in part, an apparatus to generate an update document comprising one or more update statuses of one or more resources. At least one of the one or more resources is identified using a respective obfuscation identifier. The apparatus is also caused to divide the update document in one or more pages. The apparatus is further caused to archive the one or more pages.

According to another embodiment, an apparatus comprises means for generating an update document comprising one or more update statuses of one or more resources. At least one of the one or more resources is identified using a respective obfuscation identifier. The apparatus also comprises means for dividing the update document in one or more pages. The apparatus further comprises means for archiving the one or more pages.

According to one embodiment, a method comprises retrieving an update document comprising one or more update statuses of one or more resources. At least one of the one or more resources is identified using a respective obfuscation identifier. The method also comprises determining whether one or more previously archived versions of the update document has been processed. The method further comprises processing the update document, the one or more previously archived versions of the update document, or a combination thereof based, at least in part, on the determination. The processing identifies at least one of the one or more update statuses for one or more resources of interest.

According to another embodiment, an apparatus comprising at least one processor, and at least one memory including computer program code, the at least one memory and the computer program code configured to, with the at least one processor, cause, at least in part, the apparatus to retrieve an update document comprising one or more update statuses of one or more resources. At least one of the one or more resources is identified using a respective obfuscation identifier. The apparatus is also caused to determine whether one or more previously archived versions of the update document has been processed. The apparatus is further caused to process the update document, the one or more previously archived versions of the update document, or a combination thereof based, at least in part, on the determination. The processing identifies at least one of the one or more update statuses for one or more resources of interest.

According to another embodiment, a computer-readable storage medium carrying one or more sequences of one or more instructions which, when executed by one or more processors, cause, at least in part, an apparatus to retrieve an update document comprising one or more update statuses of one or more resources. At least one of the one or more resources is identified using a respective obfuscation identifier. The apparatus is also caused to determine whether one or more previously archived versions of the update document has been processed. The apparatus is further caused to process the update document, the one or more previously archived versions of the update document, or a combination thereof based, at least in part, on the determination. The processing identifies at least one of the one or more update statuses for one or more resources of interest.

According to another embodiment, an apparatus comprises means for retrieving an update document comprising one or more update statuses of one or more resources. At least one of the one or more resources is identified using a respective obfuscation identifier. The apparatus also comprises means for determining whether one or more previously archived versions of the update document has been processed. The apparatus further comprises means for processing the update document, the one or more previously archived versions of the update document, or a combination thereof based, at least in part, on the determination. The processing identifies at least one of the one or more update statuses for one or more resources of interest.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing an update feed to clients are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
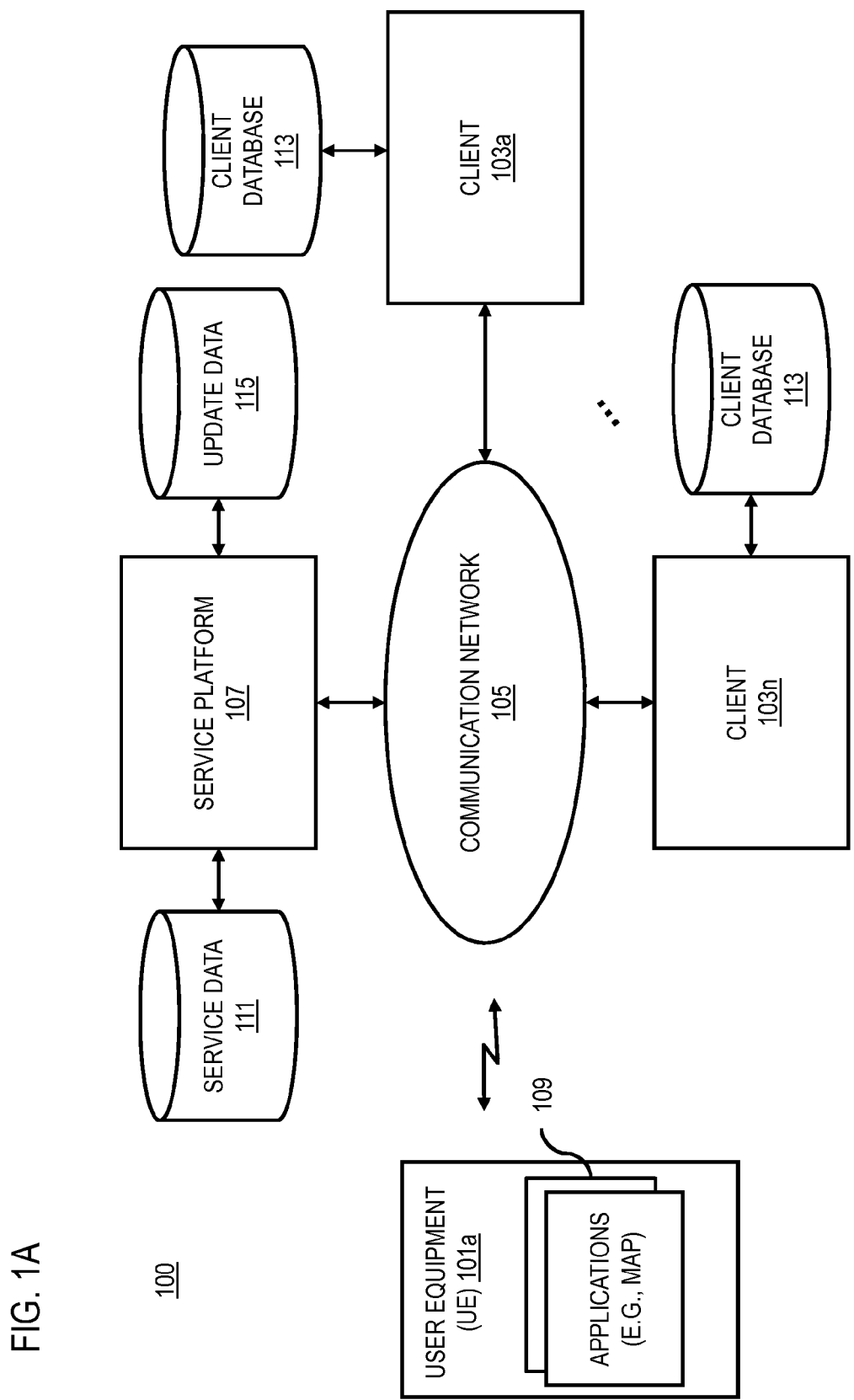
FIG. 1A is a diagram of a system capable of providing an update feed to clients, according to one embodiment.
FIGS. 1B and 1C are diagrams of pseudo code associated with utilizing a Paged Simple Update Protocol, according to various embodiments.

FIG. 1A is a diagram of a system capable of providing an update feed to clients by utilizing obfuscation identifiers, dividing update documents into multiple pages, and/or archiving the pages, according to one embodiment. As previously noted, there is a need to overcome technical limitations of various web syndication formats and protocols to supporting update feeds for clients subscribed to services that provide potentially large numbers of simultaneous updates or that provide updates more frequently than can be processed by the client. In certain embodiments, clients can include both consumers (e.g., individual users accessing content for personal purposes), commercial users (e.g., partner services or businesses of a service provider, content resellers, etc.), or any combination thereof.

Historically, different types of update feeds have been utilized by service providers. One type of update feed implementation is the Atom feed. The Atom Publishing Protocol (APP) is a simple Hypertext Transfer Protocol (HTTP)-based protocol to create and update web resources. However, APP does not provide for many features that a service provider and/or client may find beneficial. For example, APP lacks a method to obfuscate information. A benefit of obfuscation is to guard private or competitive data.

As such, if clients are partners with the service provider, a client may not want other clients to have access to information private to the client.

Another type of update feed implementation is the Simple Update Protocol (SUP). A SUP is a type of "ping feed" service providers can produce to alert users of their feeds when a feed has been updated. In certain embodiments, a feed is a data format for providing users with updated content. The feed can generate an identifier leading to a resource where the updated content is available. In certain examples, resources (e.g., content) can be identified with Uniform Resource Locators (URLs). Advantages of a SUP include that the SUP is cacheable, supports aggregation from multiple systems, has low bandwidth consumption, is pre-generateable, and is based on HTTP. However, SUP has many shortcomings. For example, SUP makes many assumptions that may not be appropriate for particular systems of feeds. One example is that SUP assumes that clients have unlimited capabilities. Thus, for systems that expect large change or update peaks, a simple client implementation may not be able to process all of the updates within an update period. The simple client thus may risk missing the next update document. Further, SUP assumes that clients are running all of the time or have downtime shorter than the longest supported update period. For many simple client implementations, this restriction can create an undue burden. Moreover, the SUP assumes that the client does not need reliable notifications and the client can always fall back to polling if the client misses an update (e.g., due to problems within the client or any infrastructure component between the client and the SUP server).

To address this problem, a system 100 of FIG. 1A introduces the capability to provide update feeds to clients. These update feeds may include using obfuscation identifiers to guard private data, dividing update documents into multiple pages to increase efficiency, and archiving the pages to increase reliability. This novel combination of features allows for users of user equipment (UE) 101 or clients 103a-103n to retrieve update feeds over a communication network 105 from a service platform 107. Different kinds of services may be performed by the service platform 107. For example, the service platform 107 may provide a mapping service to one or more UEs 101 via an application 109 (e.g., a map application). Service data 111 associated with the mapping service or other services can be stored in a database associated with the service platform 107. In certain embodiments, the service data 111 is associated with one or more clients 103. The clients 103 may maintain a client database 113 storing information associated with the service data 111. One or more resources can allow for clients 103 to access the service data 111.

In certain embodiments, when service data 111 is updated, the service platform 107 generates update data 115. The update data 115 can include information about what service data 111 was updated, an identifier or pointer to the updated service data 111, the updated content, combinations thereof, etc. Further, notifications about updates to the service data 111 can be made via using a Paged Simple Update Protocol (PSUP). The PSUP can be implemented based on one or more technologies (e.g., SUP, APP, etc.) or be separate from existing technologies. In certain embodiments, the PSUP can incorporate technology and/or protocols such as the Internet Engineering Task Force (IETF) Proposed Standard "Feed Paging and Archiving" (RFC 5005).

The PSUP can include a feed representation with one or more relationship link-elements in an update document. The PSUP can be implemented in one or more languages such as the Extensible Markup Language (XML), JavaScript Object Notation (JSON), HTTP, a combination thereof, etc. In certain embodiments, an update document can include full or summarized text of content that was updated (e.g., content stored in the service data 111) as well as metadata such as publishing dates, authorship, timestamps associated with updates, etc. Further, the update document can include one or more update entries associated with updated content (e.g., in the service data 111). Update entries can include update statuses of the updated content and/or the update status of the feed (e.g., whether the content was updated, whether the content was updated and not yet read, etc.) associated with the updated content.

Moreover, the update document can be split into multiple documents or pages to save bandwidth for the service platform 107. As such, the service platform 107 allows "sliding window" access to the pages. Paged feeds can split entries associated with an update document into multiple temporary documents. This may be useful when entries in the feed are not stable and the client 103 need only access an arbitrary portion of the feed. The paged feed pages can be linked together to contain the entries of a logical feed (e.g., the update document). However, there are generally no guarantees as to the stability of the documents' contents. Thus, paged feeds are lossy (e.g., it is not possible to guarantee that clients can reconstruct the contents of the logical feed at a particular time). Thus, entries may be added or changed as pages of the feed are accessed without the client 103 knowing. A benefit to paged feeds is that when the number of entries are very large, indeterminate, or infinite, clients 103 can page through the feed accessing a subset of the feed entries that the clients 103 are interested in. However, in certain embodiments, the client 103 and/or service provider may wish to be guaranteed that the client 103 receives the updates.

The PSUP can include archived feeds that split entries among multiple permanent documents to increase reliability in the feeds. These documents can be archived in the update data 115. A benefit of archived feeds is that the clients 103 have access to the documents in case the client 103 missed an update. Access to archived feeds can be provided through a subscription document. In certain embodiments, the subscription document includes hyperlinks to the archived feed to allow a client 103 to update missed data. Further, the updated document can include the subscription document for an archived update feed. In one example, the PSUP implementation can limit the maximum number of entries in a subscription document.

Moreover, the subscription document may become a paged feed. In this implementation, each paged document may or must include a corresponding link header with a relation type "next" unless no following page exists. That is, the paged document should include the next page of the subscription document during a particular period of the subscription document if the next page exists. In certain embodiments, the period and/or timestamps of a paged subscription document may or must be identical for all paged documents. That is, when an update document (e.g., the subscription document) is broken up into pages, a single timestamp and/or period identifier is used. Thus, the subscription document can be considered a "dynamic" document.

In one example implementation of the PSUP, each PSUP subscription document may or must include a link header with an attribute that describes the relationship of the PSUP subscription document to a particular anchor. In certain embodiments, the relationship attribute includes a relationship type of previous archive that provides a hyperlink to an update document that covers the archived updates of the previous period if such a previous period exists.

Further, in another example implementation of the PSUP, the subscription document may or must include a hyperlink with a relationship to "first." This relation type "first" can be a resource identifier that does not link to an archived feed, but may be utilized later as a resource identifier (e.g., a Universal Resource Identifier (URI)) of an archive document. In certain embodiments, if the URI is used as a hyperlink of an archive document, the PSUP implementation may or must guarantee that a client 103 will not find any updates in the chain of archive documents starting with that archive document that had not already been included in the subscription document and/or its chain of archive documents.

Additionally or alternatively, one embodiment of the PSUP includes an archive document. A period that is covered by a particular archive document can be determined based on a particular implementation of the PSUP. Thus, in some examples, a client 103 may not request an archived document for a specific period. This implementation however does allow for additional structure and lower overhead because archive documents are not required to include an "available periods" attribute. The archive document may include a "period" attribute that calculates a difference between a "since_time" and an "updated_time." It is noted, however, that this is an example implementation of utilizing archive documents. In other embodiments, different technologies (e.g., ATOM) can be utilized in implementing archiving functionality.

Moreover, the PSUP archive documents can include one or more link relationships to the subscription and/or archive documents together. For example, the PSUP archive document may or must include a "prev-archive" URI that can refer to the immediately preceding archive document (if there is a preceding archive document). Moreover, the PSUP archive document may include a "next-archive" URI that can refer to an immediately following archive document (if an immediately following archive document exists), a "current" URI that, when dereferenced, can return a feed document including the most recent entries in the feed.

In certain embodiments, the PSUP implementation need not archive update feeds forever. Moreover, the PSUP implementation may split or combine multiple archived documents to increase storage efficiency. In certain examples, the PSUP implementation may or must guarantee that every request to the URI that is referenced in an archive document will return an HTTP status OK. That is, only contain updates that have been included in a previous response for the same URI or in one of the archive documents accessible through reflexive resolving of hyperlink with a relationship type of "prev-archive." Further in certain examples, the PSUP implementation may or must guarantee that both attributes "since_time" and "update_time" of an archive document are never lower than the corresponding values of these attributes inside of the previous archive document (e.g., linked via the "prev_archive" URI).

Additionally, the PSUP implementation can utilize obfuscation identifiers to ensure that information private to one client 103a is not provided to another client 103n. As such, obfuscation identifier can be utilized in place of or in combination with URLs. These obfuscation identifiers may be encoded so that a client 103 with knowledge of the method to decode the obfuscation identifier can decode the obfuscation identifiers to retrieve updated content. Example methods to decode the obfuscation identifier may include a key, a hash table, etc. For example, the obfuscation identifier may include information that when added to a known HTTP link can generate a link to the content.

In certain embodiments, each resource (e.g., identified by its URL) can provide a second identifier that is part of the resource's attributes. A resource may be a location where updates can be retrieved. With this approach, only clients 103 that have access to the resource can know how to utilize the obfuscated identifier. Thus, if a client 103 attempts to process an update feed, it needs to be able determine the obfuscated identifier and associated resources. This may be accomplished, e.g., by storing and utilizing a mapping table of obfuscated identifiers to URLs. When the client 103 processes the update feed, which in one scenario only includes obfuscated identifiers, it can resolve URLs for resources that the client 103 knew prior to receiving the obfuscated identifier. In certain embodiments, the client 103 can only resolve URLs for resources that the client 103 knew prior to receiving the obfuscated identifier.

As previously noted, in one embodiment, archiving and other protocol features can be based on existing protocol technologies. For example, the ATOM protocol, which supports the "Feed Paging and Archiving" (RFC 5005), can be utilized as a basis for implementing the PSUP. Existing client libraries of the ATOM protocol include implementations of archived feeds and/or paged feeds (e.g., based on the RFC 5005). For example, an ATOM formatted paged feed can be implemented to include a "first" URI that refers to the furthest preceding document in a series of documents, a "last" URI that refers to the furthest following document in a series of documents (e.g., the newest document), a "previous" URI that refers to the immediately preceding document in a series of documents, and a "next" URI that refers the immediately following document in a series of documents. In certain implementations, an ATOM paged feed document has at least one of the aforementioned URIs. In some examples, the ATOM paged feed documents can have as many of the URIs as practical and/or applicable.

Further, in certain embodiments of the approach described herein, the ATOM paged feed documents can include links and/or obfuscation identifiers leading to resources based at the paged documents. For example, a paged feed document may include a string including <link rel="self" href="[root]/atom"> as well as a string including <link rel="next" href="[root]/atom?page=2">. As noted above, the obfuscated identifiers can be utilized to determine associated resources. For example, an update entry associated with the paged link can include an obfuscated identifier, which may be utilized to identify an associated resource as previously detailed.

The client 103 can aggregate information posted via the feeds of the service platform 107 via a feed aggregator program. A feed aggregator program (e.g., a feed reader, a news reader, an aggregator, etc.) can be client software that aggregates syndicated web content in a single location to facilitate viewing. Embodiments associated with the PSUP aggregation processing in clients 103 is further detailed in FIGS. 1B and 1C.

For simplicity to describe interactions, the service platform 107 updates and/or maintains the service data 111 and/or update data 115. However, it is contemplated that a first service platform 107 provides and updates service data 111 and sends a transmission to a second service platform 107 over the communication network 105 to update the update data 115. As such, resources can be remote to the second service platform 107.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, Personal Digital Assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, service platform 107, and clients 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the service platform 107 may interact according to a client-server model with the applications 109 of the UE 101 and clients 103. According to the client-server model, a client process sends a message including a request to a server process, and the server process responds by providing a service (e.g., mapping information, backend API access, messaging, etc.). The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

FIGS. 1B and 1C are diagrams of pseudo code associated with utilizing a Paged Simple Update Protocol, according to various embodiments. A client 103 can retrieve an update document including one or more update statuses of one or more resources from the service platform 107. The client 103 can be subscribed to one or more resources of the service platform 107 to retrieve the update document. Further, these feeds can include respective obfuscation identifiers so that private content may be hidden from other users.

The client 103 then determines whether one or more previously archived versions of the update document have been processed during processing of the update document. Example pseudo code 121 of the processing of the subscription is included in FIG. 1B. Further, the client 103 can determine whether the client 103 missed an update document. If the client 103 missed an update document, the retrieved update document can be utilized to retrieve the previously archived update document via an embedded "prev-archive" identifier. The archived update document can then be retrieved. Further, additional archived documents can be retrieved until the client 103 determines that any missing updates have been found. This may be accomplished by the client 103 comparing a since_time and/or update_time of the last update document that the client 103 retrieved to the current update document and/or archived update documents. Example pseudo code 123 for such processing of the subscription to catch up on previous archives is included in FIG. 1B. The pseudo code is an example and it is noted that one or more other types of implementations may be utilized for archiving (e.g., using archiving available via the ATOM protocol).

Further, the processing of the update document may additionally include processing subscription pages of the update document. Pseudo code 141 for retrieving the subscription pages is provided in FIG. 1C. The pseudo code 141 can traverse links associated with the pages to compile information stored in the update document. Moreover, the client 103 can process the update document to update its client database 113. The client database 113 may include information corresponding to particular service data 111. Exemplary pseudo code 143 is provided in FIG. 1C for processing updates. Further, as previously noted, the processing of these updates can correspond to decoding obfuscation identifiers.

Figure 2:
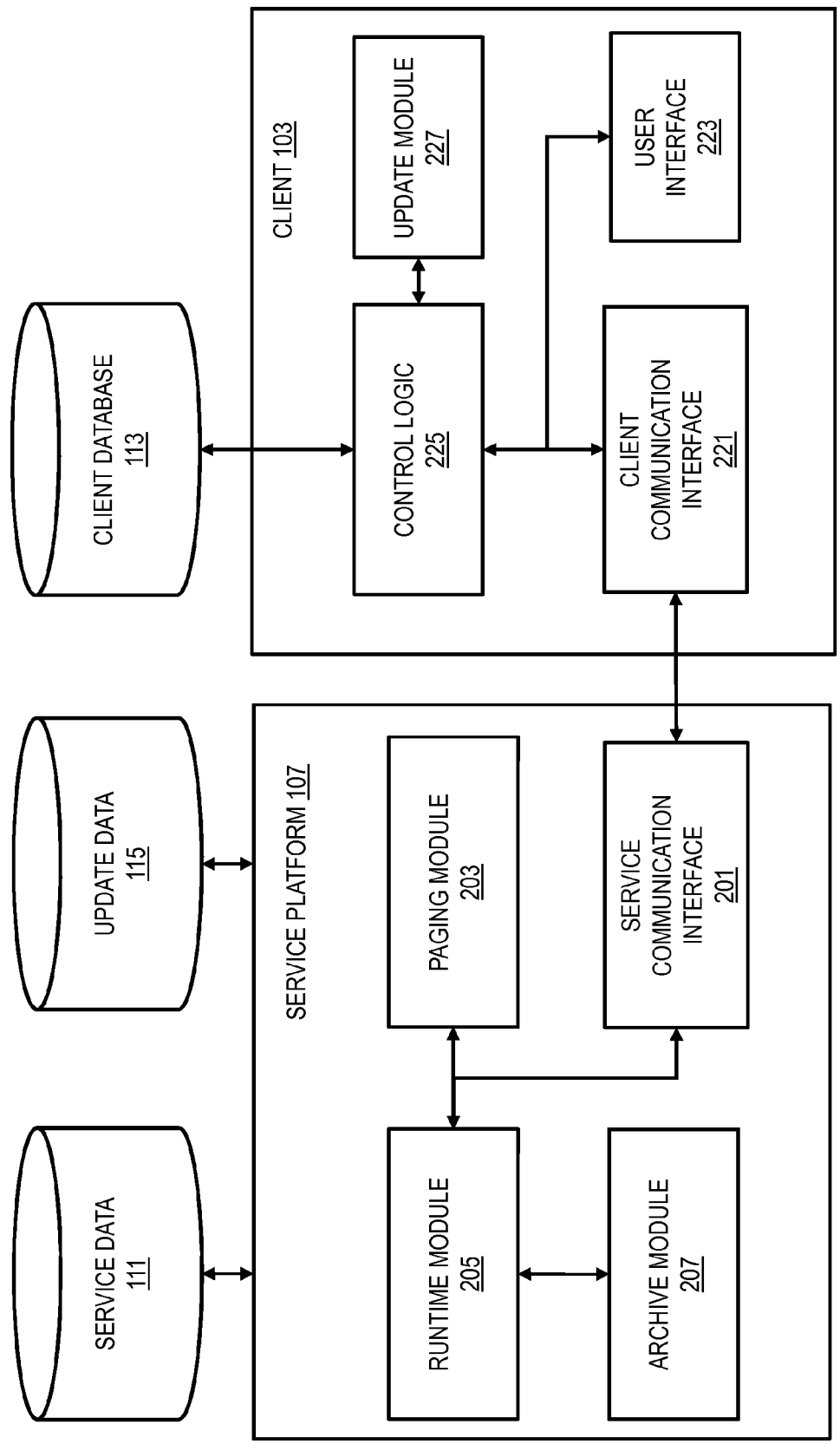
FIG. 2 is a diagram of the components of a service platform and client, according to one embodiment.

FIG. 2 is a diagram of the components of a service platform and client, according to one embodiment. By way of example, the service platform 107 includes one or more components for providing updates to content to clients. It is contemplated that the functions of these components may be combined in one or more components or performed by other components of equivalent functionality. In this embodiment, the service platform 107 includes a service communication interface 201, a paging module 203 to page update documents, a runtime module 205 to control and/or coordinate with other modules, and an archive module 207 to archive pages.

The service communication interface 201 can be used to communicate with a UE 101, a client 103, other service platforms 107, or other components on the communication network 105. The service platform 107 can receive information from the UE 101 and clients via the service communication interface 201 via methods such as internet protocol, MMS, SMS, GPRS, or any other available communication method. The UE 101 can send information to the service platform 107 for many reasons, such as to update content in the service data 111. Further, in certain embodiments, the service data 111 is located at another service platform and the service platform 107 receives a notification that the content has been updated. The runtime module 205 then causes generation of an update entry to notify clients 103 subscribing to a feed about the updated content.

Once generated, the update document may be published to clients 103. Further, in certain embodiments, the update document can be split into pages via the paging module 203 as previously detailed. As such, the paging module 203 can be a means for dividing the update document into one or more pages. The update information may be stored in the update data 115. Further, after a period of time and/or a triggering event (e.g., based on a time or a number of entries), the archive module 207 may be utilized to archive the pages and/or update document in the update data 115. As such, the archive module 207 can be a means for archiving one or more pages. These paged documents can be provided to clients 103 based on a request from the client(s) 103.

By way of example, the client 103 includes one or more components for providing decoding identifiers and retrieving update documents, pages, and/or content. It is contemplated that the functions of these components may be combined in one or more components or performed by other components of equivalent functionality. In this embodiment, the client 103 includes a client communication interface 221, a user interface 223, control logic 225, and an update module 227.

The client communication interface 221 can be used to communicate with a UE 101, a service platform 107, or other components on the communication network 105. The client 103 can receive information from the UE 101 and service platform 107 via the client communication interface 221 via methods such as internet protocol, MMS, SMS, GPRS, or any other available communication method. The service platform 107 can send the client 103 information for many reasons, such as to notify the client 103 of updated content via the PSUP. As such, the client communication interface 221 can be utilized in requesting and/or polling update documents and/or pages and receiving update documents and/or pages that are live or archived on the service platform 107.

Further, in certain embodiments, the client communication interface 221 can retrieve content from the service data 111 and/or update content in the service data 111. The client communication interface 221 and the service communication interface 201 can communicate via an application programming interface (API) so allow the client to access, utilize and/or update the content.

The user interface 223 can include various methods of communication. For example, the user interface 223 can have outputs including a visual component (e.g., a screen), an audio component, a physical component (e.g., vibrations), and other methods of communication. User inputs can include a touch-screen interface, a scroll-and-click interface, a button interface, a microphone, etc. Moreover, the user interface 223 may be used to display maps, navigation information, camera images and streams, augmented reality application information, POIs, virtual reality map images, panoramic images, messages, developer information, etc. stored in the client database 113. Input can be via one or more methods such as voice input, textual input, typed input, typed touch-screen input, other touch-enabled input, etc.

The control logic 225 can retrieve update documents from the service platform 107 to determine when content associated with the client 103 is updated. The control logic 225 can further utilize the update module 227 to stay up to date on alerts (e.g., entries) of the update documents. The update module 227 can thus process update documents and/or pages as described above. As such, the update module 227 can be a means for processing the update document. Further, the update module 227 can be utilized to determine and retrieve content associated with entries in the update documents. For example, the content can be retrieved from the service data 111.

Figure 3:
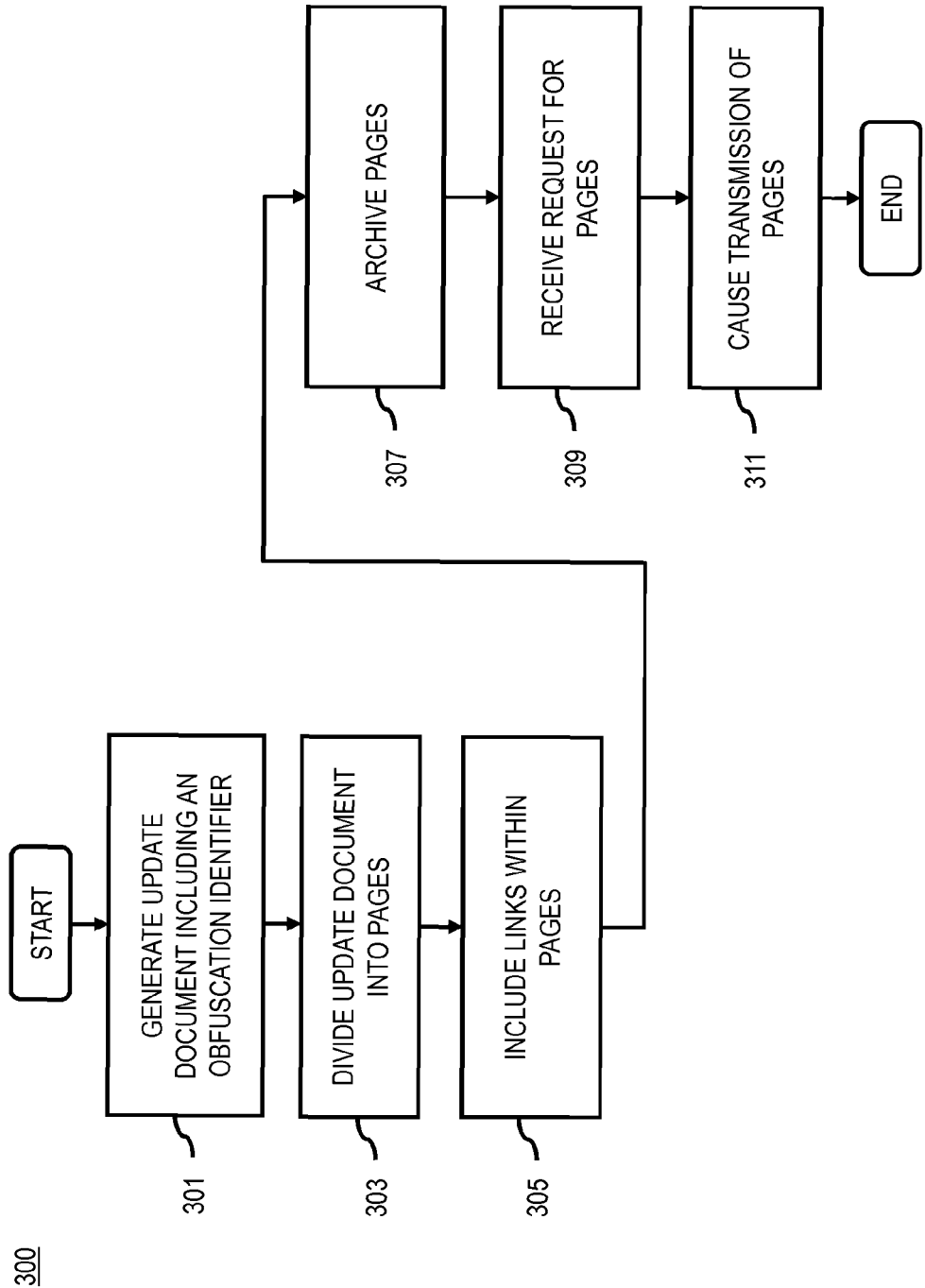
FIG. 3 is a flowchart of a process for generating an update feed to clients, according to one embodiment.
Figure 7:
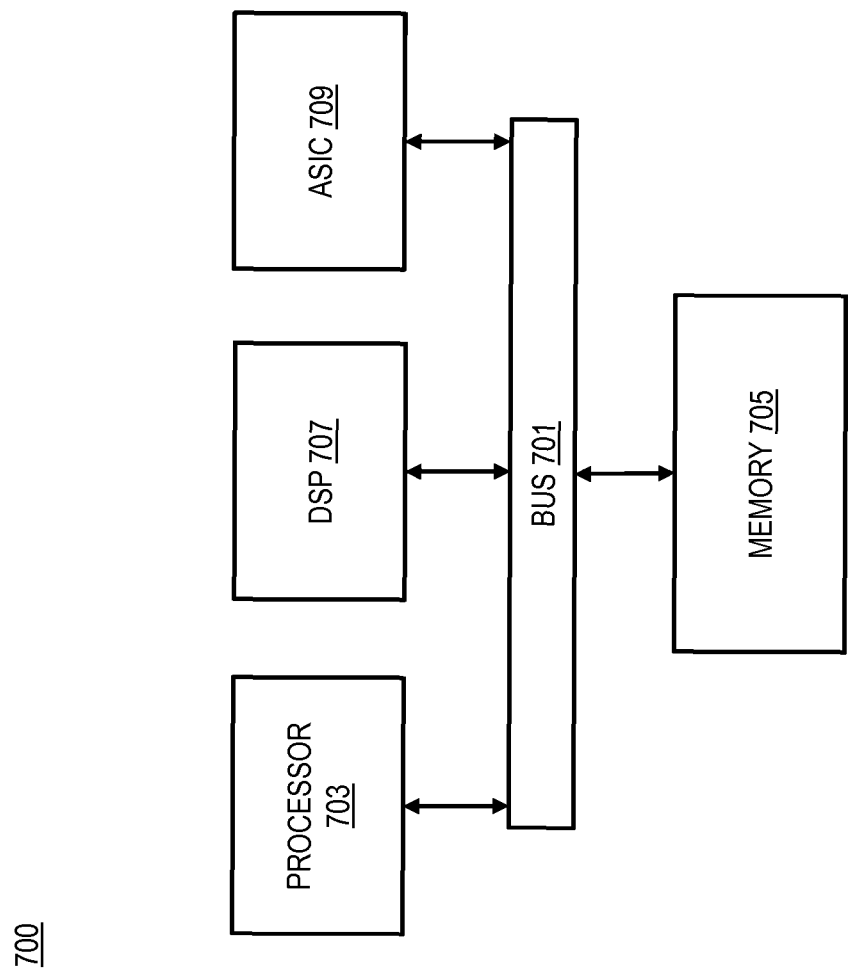
FIG. 7 is a diagram of a chip set that can be used to implement an embodiment of the invention.

FIG. 3 is a flowchart of a process for generating an update feed to clients, according to one embodiment. In one embodiment, the runtime module 205 of the service platform 107 performs the process 300 and is implemented in, for instance, a chip set including a processor and a memory as shown in FIG. 7. As such, the runtime module 205 can provide a means for accomplishing various parts of the process 300 as well as means for accomplishing other processes in conjunction with other components of the service platform 107 and/or clients 103. The service platform 107 can determine that one or more status entries to an update syndication feed should be added to an update document. The runtime module 205 can make this determination based on a received update from another platform providing services (e.g., a content platform, a map services platform, etc.) or can make this determination based on a detection of an update to service data 111. The runtime module 205 can additionally have access to other information about the content such as a time of update, an author, a title, subscriptions associated with the content, encoding information, etc.

In step 301, the runtime module 205 generates an update document comprising one or more status entries of one or more resources. These status entries can correspond to the updated content. Further, at least one of the one or more resources can be identified using a respective obfuscation identifier. The obfuscation identifier may be utilized to guard private and/or competitive data. For example, the service platform 107 may not want to publish a complete list of feed Universal Resource Locators (URLs) to different clients 103 when some of the URLs include private information. In certain embodiments, the obfuscation identifier allows the service provider to specify an arbitrary string of letters and/or numbers to identify each resource. In certain embodiments, the only ways to utilize the obfuscation identifier is by downloading from the resource and/or by receiving it from the service platform 107 in another manner (e.g., via registration for a subscription). Another advantage of the obfuscation identifier is that it may be shorter than URLs, which is advantageous for reducing bandwidth overhead of the service platform 107. In certain embodiments, the obfuscation identifier can be based on a user/client identifier. As such, the same obfuscation identifier may be assigned to URLs. These URLs may be known to the clients 103 (e.g., via a mapping of obfuscation identifiers to resource URLs) to allow for the respective clients 103 to retrieve content based on the URLs. In other embodiments, the obfuscation identifiers may be URL hashes or otherwise encoded in a manner so that the corresponding clients 103 can decode.

Then, at step 303, the runtime module 205 can utilize the paging module 203 to divide the update document into one or more pages. The dividing of the update document can include determining that a number of the one or more update statuses is greater than a threshold (e.g., maximum) number. The dividing of the update document can be based on the determination. For example, to increase efficiency of sending updates, the update document can be limited to a certain size that when reached causes the update document to be split into pages. In another embodiment, the pages can be determined based on a period of time. As such, when the threshold period is met, a new page is generated. Further, the paging module 203 can include one or more links among the one or more pages in meta-data associated with the one or more pages (step 305). Examples of such links include the "prev-archive" link, the "current" link, the "next-archive link," the "first" link, etc. as previously described.

Moreover, at step 307, the one or more pages can be archived. In certain embodiments, the archived documents should include a link to the most up to date update document (e.g., the current update document), may or must include the "prev-archive" link if there is a previous archive page, and should include a "next-archive" link if there is a next archive page. These links may be determined based on global information available to the runtime module 205 and/or based on information included in the page to be archived. As such, one or more links are included between the update document and one or more previously archived versions of the update document in meta-data associated with the one or more pages.

The runtime module 205 receives a request for the update document from a client (step 309). The request may include a request for the most recent update document and/or for one or more archived update documents. In the case of the most recent update document, multiple requests can be received for each page of the update document (e.g., via a client implementation of pseudo code 141 for processing pages). In the case of previously archived pages, the client 103 may request the pages separately based on whether the client's information is up to date (e.g., via the pseudo code 123 to catch up on previous archives). As such, the pages can be determined based on the received request. The runtime module 205 then causes, at least in part, transmission of the pages to the requesting client 103 (step 311).

Figure 4:
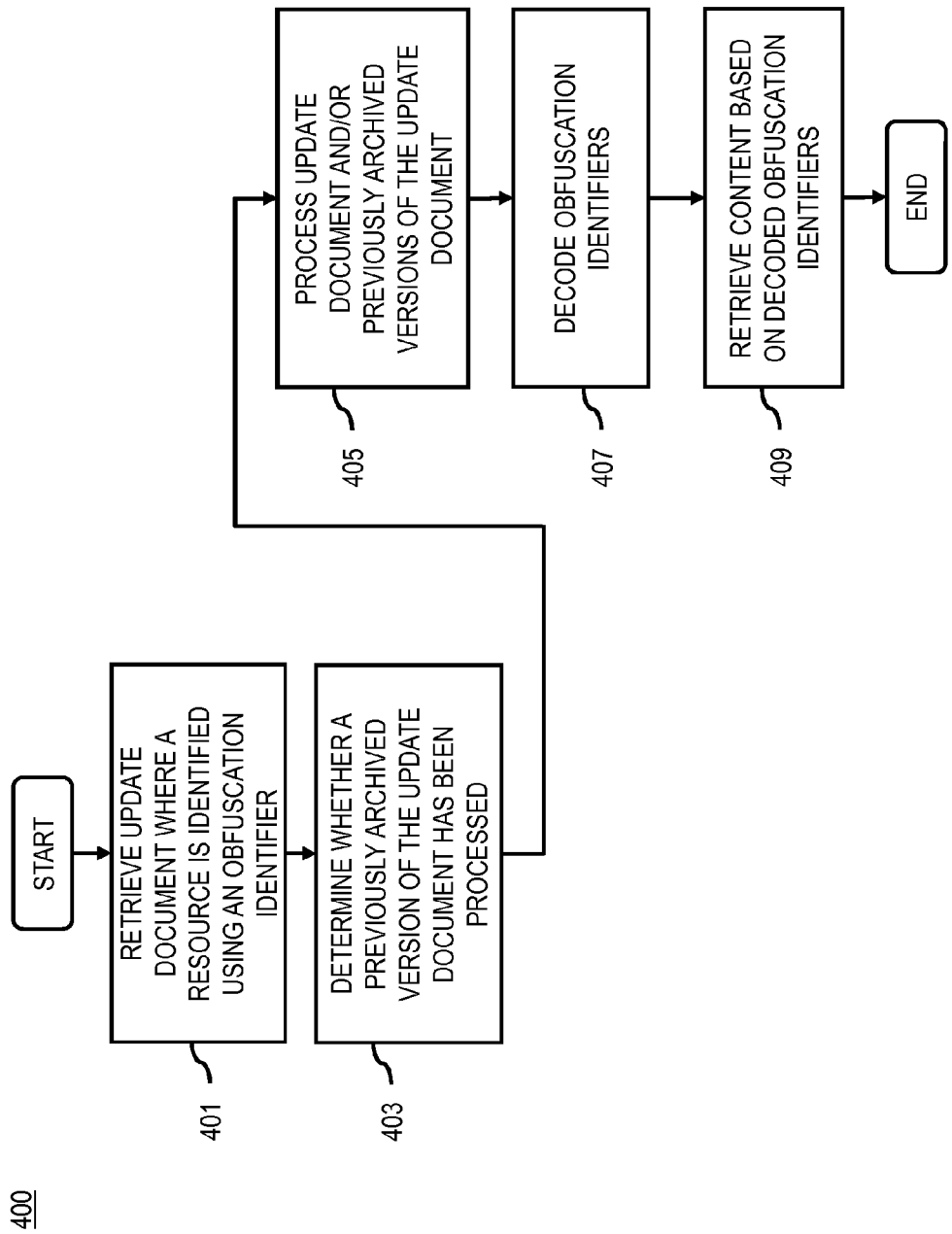
FIG. 4 is a flowchart of a process for processing an update feed to retrieve content, according to one embodiment.

FIG. 4 is a flowchart of a process for processing an update feed to retrieve content, according to one embodiment. In one embodiment, the control logic 225 of the client 103 performs the process 400 and is implemented in, for instance, a chip set including a processor and a memory as shown in FIG. 7. As such, the control logic 225 can provide a means for accomplishing various parts of the process 400 as well as means for accomplishing other processes in conjunction with other components of the client 103 and/or service platform 107. As shown in FIGS. 1B and 1C, the client 103 can poll the service platform 107 to ensure that all previously archived update documents are processed and then process a new update document.

In step 401, the control logic 225 retrieves (e.g., requests and receives) an update document including one or more update statuses of one or more resources. At least one of the one or more resources can be identified using a respective obfuscation identifier. Once the update document is retrieved, the control logic 225 can determine whether one or more previously archived versions of the update document has been processed (step 403). If it is determined that there are previously archived versions (e.g., based on a "prev-archive" link in the update document), and that the previously archived version has not been processed, the control logic 225 can cause, at least in part, retrieval of the previously archived version of the update document. In certain embodiments the previously archived version includes one or more pages.

Then, at step 405, the control logic 225 processes the update document, the one or more previously archived versions of the update document, or a combination thereof based, at least in part, on the determination of whether the previously archived version of the update document was processed. In certain embodiments, the previous archives are processed before the newest update documents are processed. As such, "prev-archive" link can be followed until the control logic 225 determines that the previous archive has been processed and then each document can be processed in order from the oldest to newest/current update document. With this approach, multiple changes to the same updated content can be marked. The processing can further identify at least one of the one or more update statuses for one or more resources of interest. The resources of interest can be based, e.g., on a subscription associated with the client 103.

During processing, the control logic 225 decodes one or more respective obfuscation identifiers for respective locations of content associated with the one or more resources of interest (step 407). These resource locations can be decoded by various methods depending on the implementation (e.g., URL hashes) of the PSUP as previously discussed. Content can then be retrieved based on the decoded obfuscation identifiers (e.g., by following a location identifier to a web link) (step 409). As noted above, decoding the obfuscation identifier can include processing a table or database at the client 103 that maps obfuscation identifiers to resource URLs.

Figure 5:
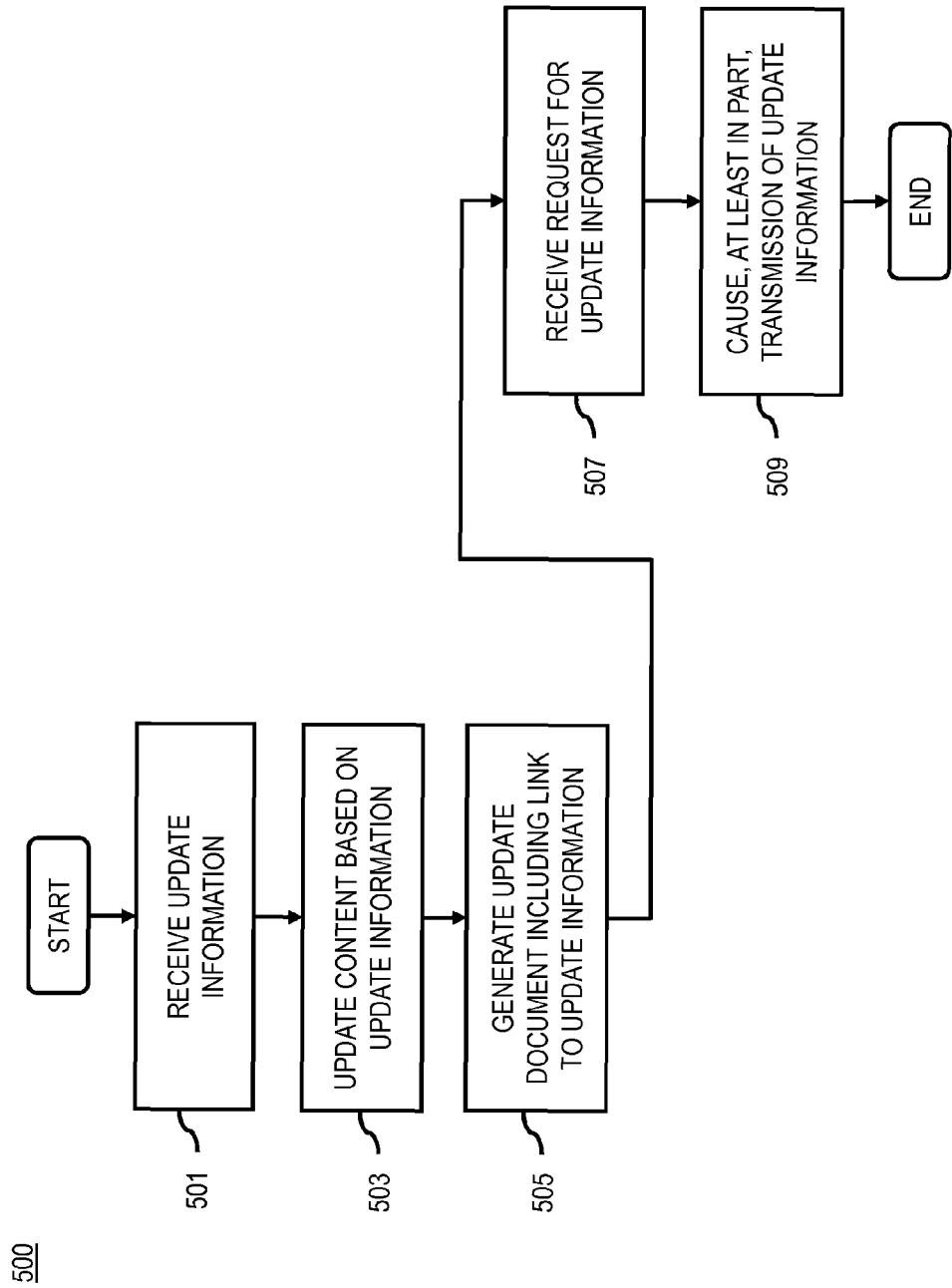
FIG. 5 is a flowchart of a process for providing update information based on an update feed request, according to one embodiment.

FIG. 5 is a flowchart of a process for providing update information based on an update feed request, according to one embodiment. In one embodiment, the runtime module 205 of the service platform 107 performs the process 500 and is implemented in, for instance, a chip set including a processor and a memory as shown in FIG. 7. As previously noted, the service platform 107 can receive updates associated with content stored in service data 111.

In step 501, the runtime module 205 receives update information to update the service data 111. The update information can be transmitted by a UE 101, client 103, or any other device on the communication network 105. In one embodiment, the information corresponds to a mapping service. For example, content, such as points-of-interest may be updated by users (e.g., via UEs 101) using a map application 109 with information (e.g., reviews, pictures, etc.). The points-of-interest can be associated with partners of the service platform 107 (e.g., a client owning or responsible for the point-of-interest updated). The service data 111 is the updated by the runtime module 205.

Then, at step 505, the runtime module 205 generates one or more update documents including a link or obfuscated identifiers leading to a location of updated content as discussed in regards to process 300. As such, a client 103 associated with the point-of-interest that was updated can find the location of the updated content via the process 400 of FIG. 4 and cause transmission of a request for the updated information. The runtime module 205 receives the request for the update information (step 507). In certain embodiments, the request may be via an API (e.g., a backend API) between the client 103 and the service platform 107. Then the runtime module 205 determines appropriate content and causes transmission of the update information (step 509). In certain embodiments, the API may allow the client 103 to perform an action corresponding to the update information (e.g., allow the information to be published, disallow the update, perform another action, such as fixing a point-of-interest deficiency noted by a user, etc.).

With the above approaches, an update document can be utilized to efficiently update clients of updated content while saving on bandwidth costs. Further, the above methods can be utilized to protect private data by utilizing obfuscation identifiers. Moreover, the use of multiple pages that can be archived provide an advantage for the service provider by saving memory and bandwidth.

The processes described herein for providing an update feed to clients may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
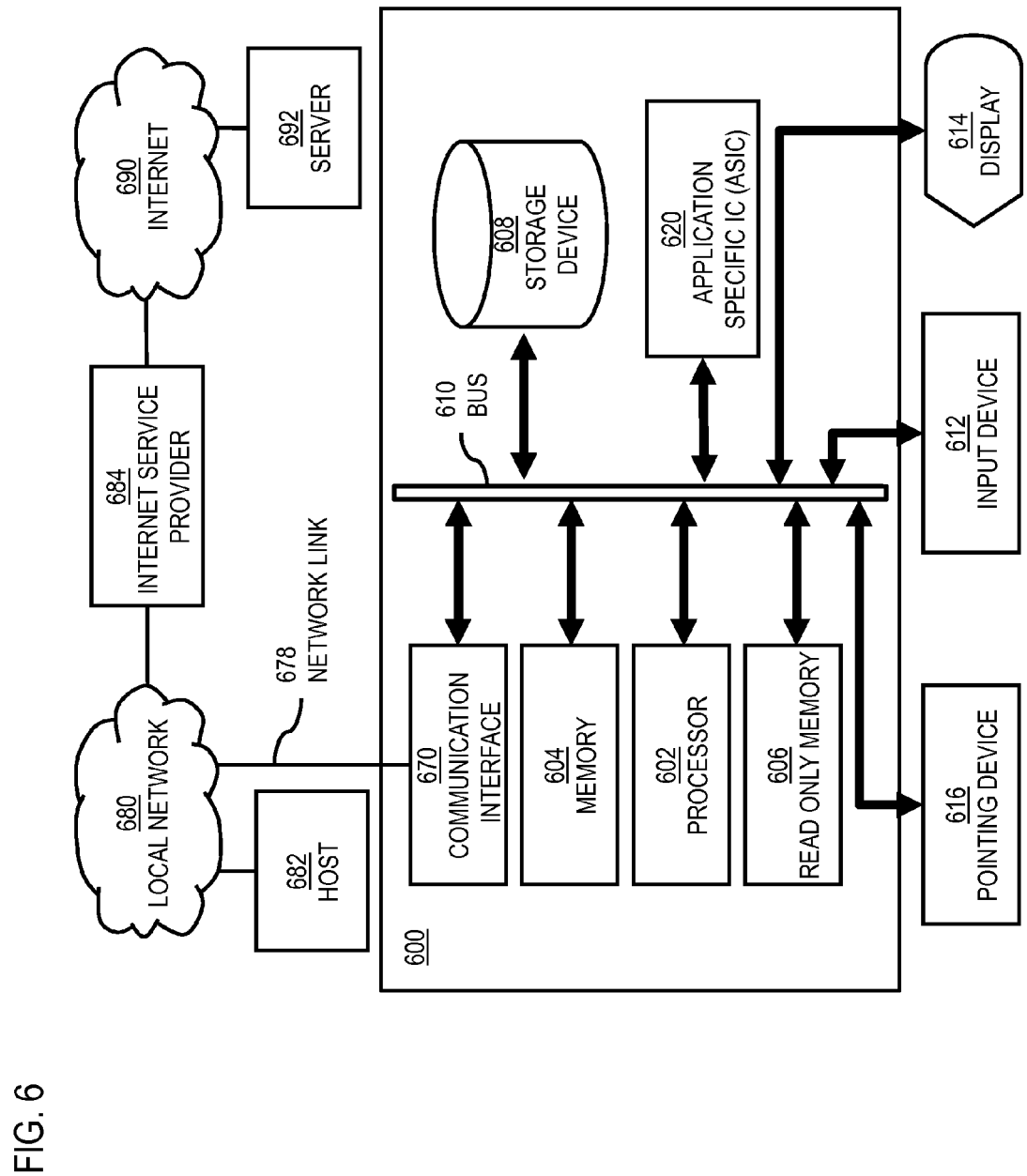
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to provide an update feed to clients as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of providing a reliable update feed to clients.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to provide an update feed to clients. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or other dynamic storage device, stores information including processor instructions for providing an update feed to clients. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for providing an update feed to clients, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT) or a liquid crystal display (LCD), or plasma screen or printer for presenting text or images, and a pointing device 616, such as a mouse or a trackball or cursor direction keys, or motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for to the UE 101 and/or client 103.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to provide an update feed to clients as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of services. Chip set or chip 700, or a portion thereof, constitutes a means for performing one or more steps of providing an update feed to clients.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to provide an update feed to clients. The memory 705 also stores the data associated with or generated by the execution of the inventive steps.

Figure 8:
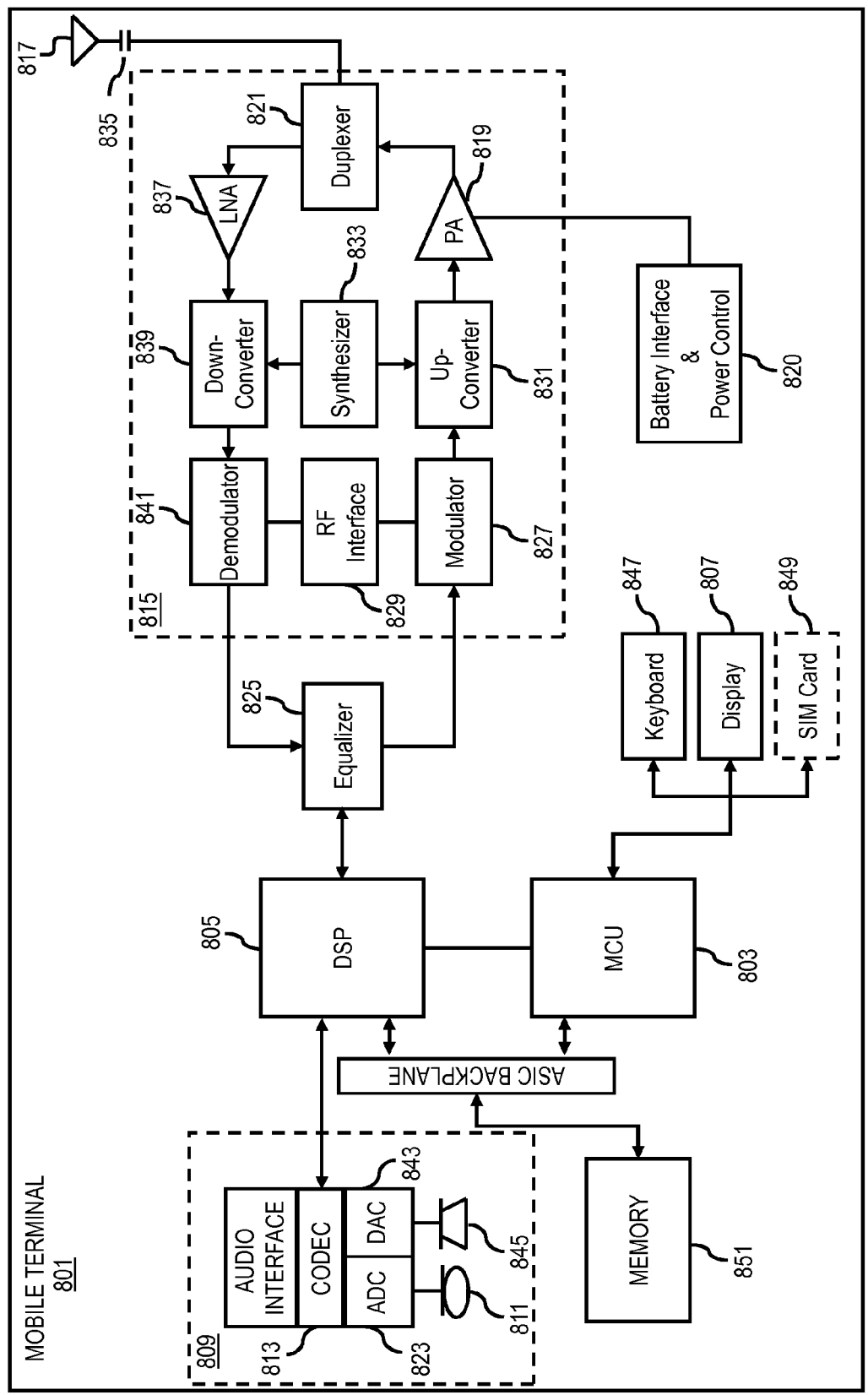
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1A, according to one embodiment. In some embodiments, mobile terminal 801, or a portion thereof, constitutes a means for performing one or more steps of retrieving and/or updating content. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of retrieving and/or updating content. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to retrieve and/or update content. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
generating, by a server device, an update document comprising one or more update statuses of one or more resources, wherein at least one of the one or more resources is identified using a respective obfuscation identifier based, at least in part, on a user identifier;
dividing the update document into a plurality of pages according to paged update protocol to produce linked page feeds that form the update document;
archiving the plurality of pages of the update document based, at least in part, on an expiration of the update document, a time interval, a schedule, on demand, or a combination thereof;
receiving a request from one or more subscribers for one of the one or more pages of the update document, or for one of the one or more archived pages of the update document based, at least in part, on whether the one or more subscriber's information is up to date;
transmitting the update document to the one or more subscribers; and
transmitting a feed of one or more obfuscation identifiers to the one or more subscribers,
wherein the at least one of the one or more resources identified using the respective obfuscation identifier provides a second identifier of a universal resource locator (URL) where the plurality of pages of the update document is archived; and
wherein each of the plurality of pages preceding an end page includes a corresponding relational link header that references the plurality of pages as a combined update document under the paged update protocol.

2. The method of claim 1, further comprising:
determining that a number of the one or more update statuses is greater than a maximum number,
wherein the dividing of the update document is based, at least in part, on the determination.

3. The method of claim 1, further comprising:
including one or more links among the plurality of pages in meta-data associated with the plurality of pages, wherein the one or more links are determined based on global information, information included in the plurality of pages archived, or a combination thereof.

4. The method of claim 1, further comprising:
including one or more links between the update document and one or more previously archived versions of the update document in meta-data associated with the plurality of pages.

5. The method of claim 1, wherein the one or more resources relate to updates of information in a mapping service.

6. An apparatus comprising:
at least one processor; and
at least one memory including computer program code for one or more programs, the at least one memory and the computer program code configured to, with the at least one processor, cause the apparatus to perform at least the following,
generate, by a server device, an update document comprising one or more update statuses of one or more resources, wherein at least one of the one or more resources is identified using a respective obfuscation identifier based, at least in part, on a user identifier;
divide the update document into a plurality of pages according to paged update protocol to produce linked page feeds that form the update document;
archive the plurality of pages of the update document based, at least in part, on an expiration of the update document, a time interval, a schedule, on demand, or a combination thereof;
receive a request from one or more subscribers for one of the one or more pages of the update document, or for one of the one or more archived pages of the update document based, at least in part, on whether the one or more subscriber's information is up to date;

transmit the update document to the one or more subscribers; and transmit a feed of one or more obfuscation identifiers to the one or more subscribers, wherein the at least one of the one or more resources identified using the respective obfuscation identifier provides a second identifier of a universal resource locator (URL) where the plurality of pages of the update document is archived; and wherein each of the plurality of pages preceding an end page includes a corresponding relational link header that references the plurality of pages as a combined update document under the paged update protocol.

7. The apparatus of claim 6, wherein the apparatus is further caused to:

determine that a number of the one or more update statuses is greater than a maximum number, wherein the dividing of the update document is based, at least in part, on the determination.

8. The apparatus of claim 6, wherein the apparatus is further caused to:

include one or more links among the plurality of pages in meta-data associated with the plurality of pages.

9. The apparatus of claim 6, wherein the apparatus is further caused to:

include one or more links between the update document and one or more previously archived versions of the update document in meta-data associated with the plurality of pages.

10. The apparatus of claim 6, wherein the one or more resources relate to updates of information in a mapping service.

11. A method comprising:

receiving a request from one or more subscribers for one or more pages of an update document, or for one or more archived pages of the update document based, at least in part, on whether the one or more subscriber's information is up to date;

retrieving, at a client device, the update document comprising one or more update statuses of one or more resources, wherein at least one of the one or more resources is identified using a respective obfuscation identifier based, at least in part, on a user identifier, and wherein at least one of one or more resources identified using a respective obfuscation identifier provides a second identifier of a universal resource locator (URL) where the one or more pages of the update document is archived, the update document divided into a plurality of pages according to paged update protocol to produce linked page feeds that form the update document;

determining whether one or more previously archived versions of the update document has been processed, wherein archiving the plurality of pages of the update document is based, at least in part, on an expiration of the update document, a time interval, a schedule, on demand, or a combination thereof;

processing the update document, the one or more previously archived versions of the update document, or a combination thereof based, at least in part, on the determination, wherein the processing identifies at least one of the one or more update statuses for one or more resources of interest; and wherein each of the plurality of pages preceding an end page includes a corresponding relational link header that references the plurality of pages as a combined update document under the paged update protocol;

transmitting the update document to the one or more subscribers; and transmitting a feed of one or more obfuscation identifiers to the one or more subscribers.

12. The method of claim 11, further comprising:

decoding one or more respective obfuscation identifiers for respective locations of content associated with the one or more resources of interest.

13. The method of claim 12, wherein the decoding is further based on a respective subscription status to the one or more resources of interest.

14. The method of claim 11, further comprising:

determining that the update document, the one or more previously archived versions of the update document, or a combination thereof includes the plurality of pages, wherein the processing is further based on the plurality of pages.

15. An apparatus comprising:

at least one processor; and at least one memory including computer program code for one or more programs, the at least one memory and the computer program code configured to, with the at least one processor, cause the apparatus to perform at least the following, receive a request from one or more subscribers for one or more pages of an update document, or for one or more archived pages of the update document based, at least in part, on whether the one or more subscriber's information is up to date;

retrieve, at a client device, the update document comprising one or more update statuses of one or more resources, wherein at least one of the one or more resources is identified using a respective obfuscation identifier based, at least in part, on a user identifier, and wherein at least one of one or more resources identified using a respective obfuscation identifier provides a second identifier of a universal resource locator (URL) where the update document is archived, the update document is divided into a plurality of pages according to paged update protocol to produce linked page feeds that form the update document;

determine whether one or more previously archived versions of the update document has been processed, wherein archiving the plurality of pages of the update document is based, at least in part, on an expiration of the update document, a time interval, a schedule, on demand, or a combination thereof;

process the update document, the one or more previously archived versions of the update document, or a combination thereof based, at least in part, on the determination, wherein the processing identifies at least one of the one or more update statuses for one or more resources of interest; and wherein each of the plurality of pages preceding an end page includes a corresponding relational link header that references the plurality of pages as a combined update document under the paged update protocol;

transmit the update document to the one or more subscribers; and transmit a feed of one or more obfuscation identifiers to the one or more subscribers.

16. The apparatus of claim 15, wherein the apparatus is further caused to:

decode one or more respective obfuscation identifiers for respective locations of content associated with the one or more resources of interest.

17. The apparatus of claim 16, wherein the decoding is further based on a respective subscription status to the one or more resources of interest.

18. The apparatus of claim 15, wherein the apparatus is further caused to:
   determine that the update document, the one or more previously archived versions of the update document, or a combination thereof includes the plurality of pages,
   wherein the processing is further based on the plurality of pages.

* * * * *